(12) United States Patent
Jimenez et al.

(10) Patent No.: US 12,274,196 B2
(45) Date of Patent: Apr. 15, 2025

(54) ELECTRIC ASSIST WALK-BEHIND SPREADER

(71) Applicant: Earthway Products Inc, Bristol, IN (US)

(72) Inventors: Joe Jimenez, Elkhart, IN (US); Michael Unrein, Perrysburg, OH (US); John Marshall, Granger, IN (US)

(73) Assignee: Earthway Products Inc, Bristol, IN (US)

( * ) Notice: Subject to any disclaimer, the term of this patent is extended or adjusted under 35 U.S.C. 154(b) by 693 days.

(21) Appl. No.: 17/477,631

(22) Filed: Sep. 17, 2021

(65) Prior Publication Data
US 2023/0089286 A1 Mar. 23, 2023

(51) Int. Cl.
*A01C 17/00* (2006.01)
*B60L 15/20* (2006.01)
(Continued)

(52) U.S. Cl.
CPC .......... *A01C 17/005* (2013.01); *A01C 17/001* (2013.01); *A01C 17/008* (2013.01);
(Continued)

(58) Field of Classification Search
CPC ....... A01C 7/085; A01C 15/006; A01C 15/06; A01C 17/00; A01C 17/001; A01C 17/005;
(Continued)

(56) References Cited

U.S. PATENT DOCUMENTS 4,597,531 A * 7/1986 Kise ........................ A01C 15/02
239/685
5,203,510 A * 4/1993 Courtney ............... A01C 15/02
239/685
(Continued)

FOREIGN PATENT DOCUMENTS

CN 206294517 U * 7/2017 ............. A01C 15/12
CN 110603938 A * 12/2019 ............. A01C 17/00
(Continued)

OTHER PUBLICATIONS

The Little Hub that Could: Build an Electric Wheelbarrow out of an Ebike Geared Hub Motor for <$300; ElectricBike-Blog.com; https://www.google.com/imgres?imgurl=https%3A%2F%2Felectricfatbike.files.wordpress.com%2F2019%2F03%2Fimg_20190320_160147884.jpg&imgrefurl=https%3A%2F%2Felectricbike-blog.com%2F2019%2F04%2F03%2Fthe-little-hub-that-could-build-a-wheelbarrow-out-of-an-ebike-geared-hub-motor-for-300%2F&tbnid=4211vv-MY9FLqM&vet=12ahUKEwjbuqHV5vbxAhVBs6wKHezDD4EQMyglegUIARCwAQ . . . .
(Continued)

*Primary Examiner* — Darren W Gorman
(74) *Attorney, Agent, or Firm* — Hovey Williams LLP; Kameron D. Kelly

(57) ABSTRACT

A broadcast spreader broadly comprising a frame, a hopper, an impeller, a set of wheels, and an electric hub motor. The hopper is supported by the frame and configured to hold a particulate material. The impeller is rotatably connected below the hopper and is configured to receive the particulate material from the hopper and spread the particulate material over a surface. The wheels are rotatably connected to the frame for traversing the surface. The electric hub motor is at least partially positioned in one of the wheels and configured (Continued)

to drivably engage the one of the wheels to propel the hopper along the surface.

10 Claims, 11 Drawing Sheets

(51) Int. Cl.
  *B60L 50/60* (2019.01)
  *A01C 7/08* (2006.01)
  *E01H 10/00* (2006.01)
(52) U.S. Cl.
  CPC ............... *B60L 15/20* (2013.01); *B60L 50/66* (2019.02); *A01C 7/085* (2013.01); *E01H 10/007* (2013.01)
(58) Field of Classification Search
  CPC ..... A01C 17/006; A01C 17/008; B60L 15/20; B60L 50/66; B60L 2220/44; B60L 2240/461; E01H 10/007
  See application file for complete search history.

(56) References Cited

U.S. PATENT DOCUMENTS

| | | | |
|---|---|---|---|
| 6,142,397 A | 11/2000 | Clay | |
| 9,409,578 B2 | 8/2016 | Wyatt et al. | |
| 10,779,464 B1 | 9/2020 | Falconer | |
| 2002/0162907 A1* | 11/2002 | Courtney | A01C 17/008 239/665 |
| 2005/0258284 A1* | 11/2005 | Magnusson | A01C 17/008 239/681 |
| 2007/0194155 A1* | 8/2007 | Kendall | A01C 17/006 239/650 |
| 2014/0345891 A1 | 11/2014 | McGowen | |
| 2020/0053956 A1* | 2/2020 | Hsu | A01C 15/02 |
| 2020/0120861 A1* | 4/2020 | Rich | B05B 12/081 |
| 2020/0188947 A1 | 6/2020 | Sevrey et al. | |
| 2021/0105945 A1* | 4/2021 | Ricketts | A01F 7/067 |

FOREIGN PATENT DOCUMENTS

| | | | | |
|---|---|---|---|---|
| CN | 112789973 A | * | 5/2021 | ........... A01C 17/001 |
| CN | 214708738 U | | 11/2021 | |
| CN | 21788439 U | | 11/2022 | |
| TW | 629841 U | | 7/2022 | |

OTHER PUBLICATIONS

Search Report dated Mar. 8, 2023 for related British Patent Application No. GB2213146.0, 4 pages.

\* cited by examiner

ELECTRIC ASSIST WALK-BEHIND SPREADER

TECHNICAL FIELD

Embodiments of the present invention relate to systems and methods for spreading particulate material.

BACKGROUND OF THE INVENTION

Broadcast spreaders are used to spread or otherwise distribute particulate material or granules such as fertilizer, grass seed, salt, sand, ice melt, and the like onto surfaces such as lawns, golf courses, turf, sidewalks, parking lots, and the like. Many broadcast spreaders are unpowered, meaning a user has to push them across the surfaces being treated. This can be tiresome and leads to varying speeds which results in insufficient, excessive, or uneven particulate dispersion. Some broadcast spreaders can be attached to tractors, all-terrain vehicles, or the like, but such machines are unattainable for many people and may not be suitable for certain surfaces or areas. Other broadcast spreaders include predominately gas-powered self-drive motors, but they require a gear box or other drive train, which adds a point of failure and maintenance. The self-drive motors typically also drive material spreading impellers and feed rate components, which prohibitively ties feed rate, spread pattern, and spreader traversing rate together.

BRIEF SUMMARY OF THE INVENTION

The instant invention is generally directed to walk-behind spreaders and electric power assist features that overcome the deficiencies of the spreaders discussed above.

More particularly, some embodiments of the instant invention are directed to a broadcast spreader that generally includes a frame, a hopper connected to the frame that is configured to hold particulate material to be spread about a surface, wheels rotatably connected to the frame and configured to roll along the surface, and a hub motor or hub motors mounted at least partially in the wheels and powered by an on-board battery for rotatably driving the wheels. The broadcast spreader may also include rotatable impellers driven by impeller motors to receive particulate material from the hopper and fling the particulate material radially outwardly onto the surface. The broadcast spreader may also include shut-off adjustment plates driven by feed motors to meter the particulate material from the hopper to the impellers, and spread guards driven by guard motors for selectively blocking particulate material from being spread by the impellers. The hub motors, impeller motors, feed motors, and guard motors may be independently controlled via a control system to effect independent spreader movement, spread patterns, and feed rates.

Other embodiments are directed to a method of operating a broadcast spreader. The method includes providing a broadcast spreader similar to that discussed above, including a frame, a hopper connected to the frame that is configured to hold particulate material to be spread about a surface, wheels rotatably connected to the frame and configured to roll along the surface, and a hub motor or hub motors mounted at least partially in the wheels and powered by an on-board battery for rotatably driving the wheels. The broadcast spreader may also include rotatable impellers driven by impeller motors to receive particulate material from the hopper and fling the particulate material radially outwardly onto the surface. The broadcast spreader may also include shut-off adjustment plates driven by feed motors to meter the particulate material from the hopper to the impellers, and spread guards driven by guard motors for selectively blocking particulate material from being spread by the impellers. The method may include activating the hub motors according to a user input or a user-initiated spreading plan so that the spreader traverses a surface along a spreading path. The method may also include independently activating the feed motors according to a user input or the user-initiated spreading plan to meter particulate matter from the hopper. The method may also include independently activating the impeller motors according to a user input or the user-initiated spreading plan to spread the particulate matter on the surface. The method may also include independently activating the guard motors according to a user input or the user-initiated spreading plan to prevent particulate matter from being spread to certain areas near the spreading path. The method may also include collecting data via sensors for control feedback and analysis.

Other embodiments are directed to an electric assist kit for use with a walk-behind spreader. The electric assist kit includes an electric motor configured to be fitted with the walk-behind spreader for providing propulsive power assistance thereto and a control system or application for at least one of interfacing with, controlling, and programming the electric motor.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE SEVERAL VIEWS OF THE DRAWINGS

The present invention is described in detail below with reference to the attached drawing figures, wherein.

Figure 1:
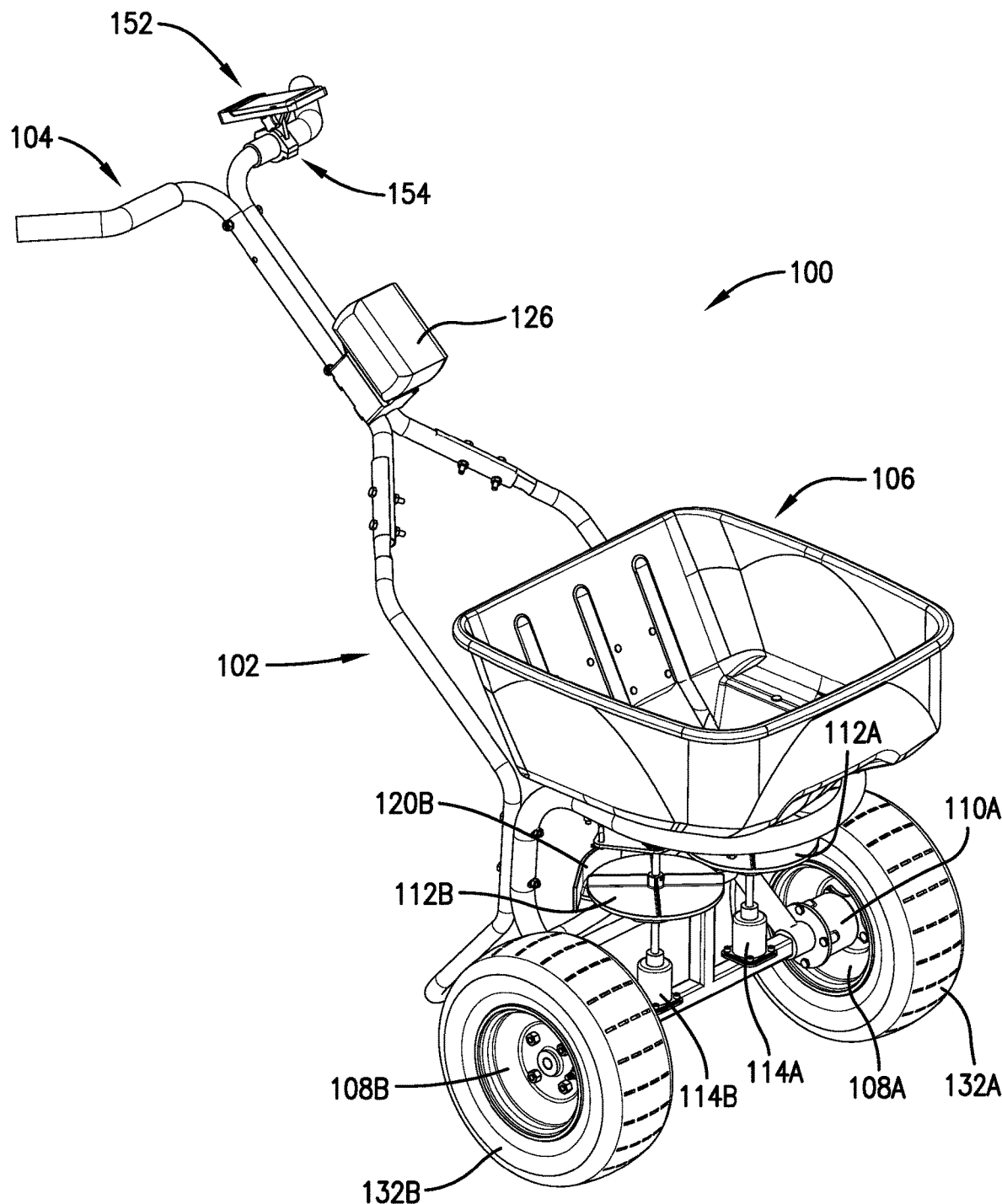
FIG. 1 is a front perspective view of a spreader constructed in accordance with an embodiment of the invention.
Figure 2:
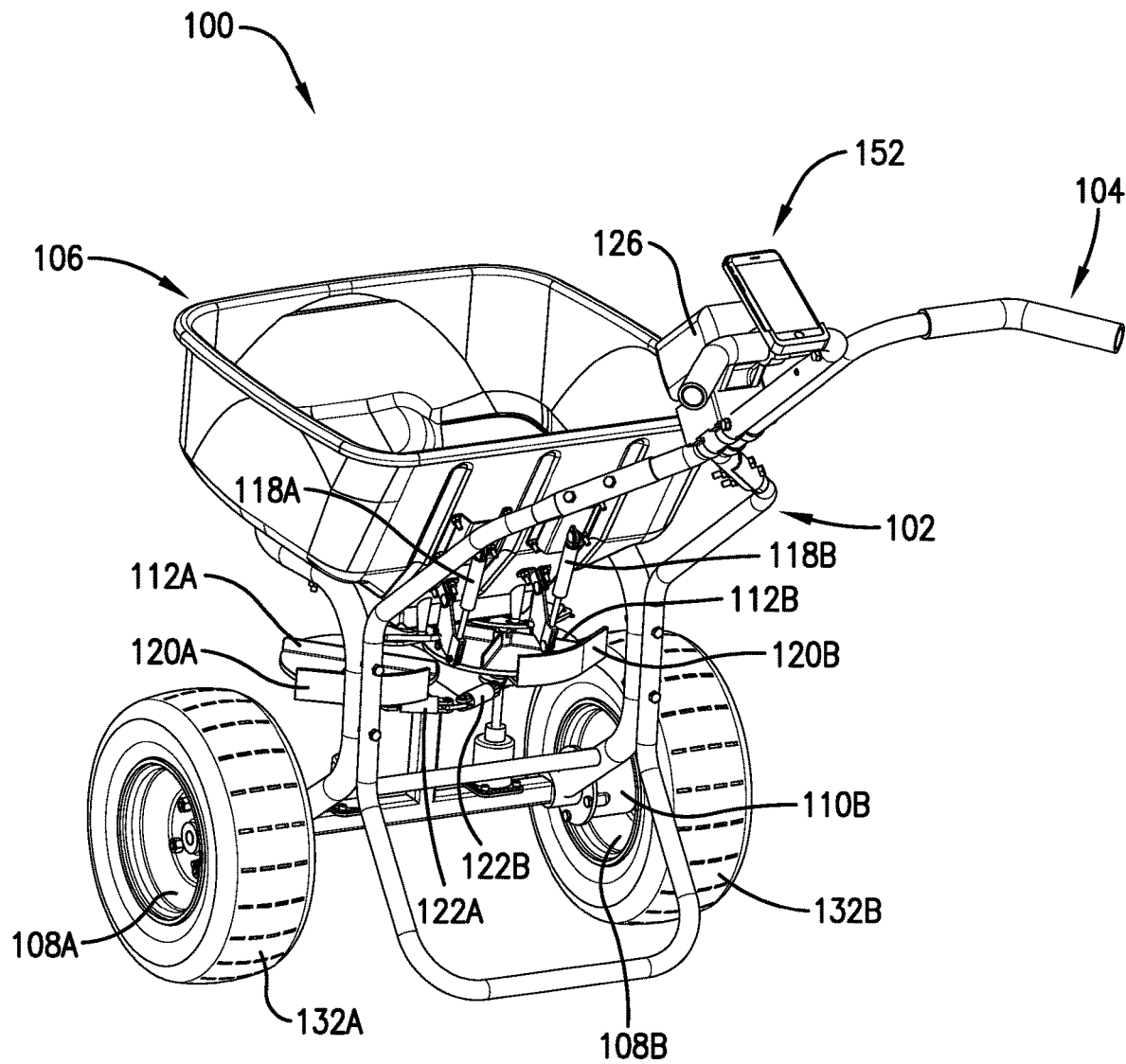
FIG. 2 is a rear perspective view of the spreader of FIG. 1.
Figure 3:
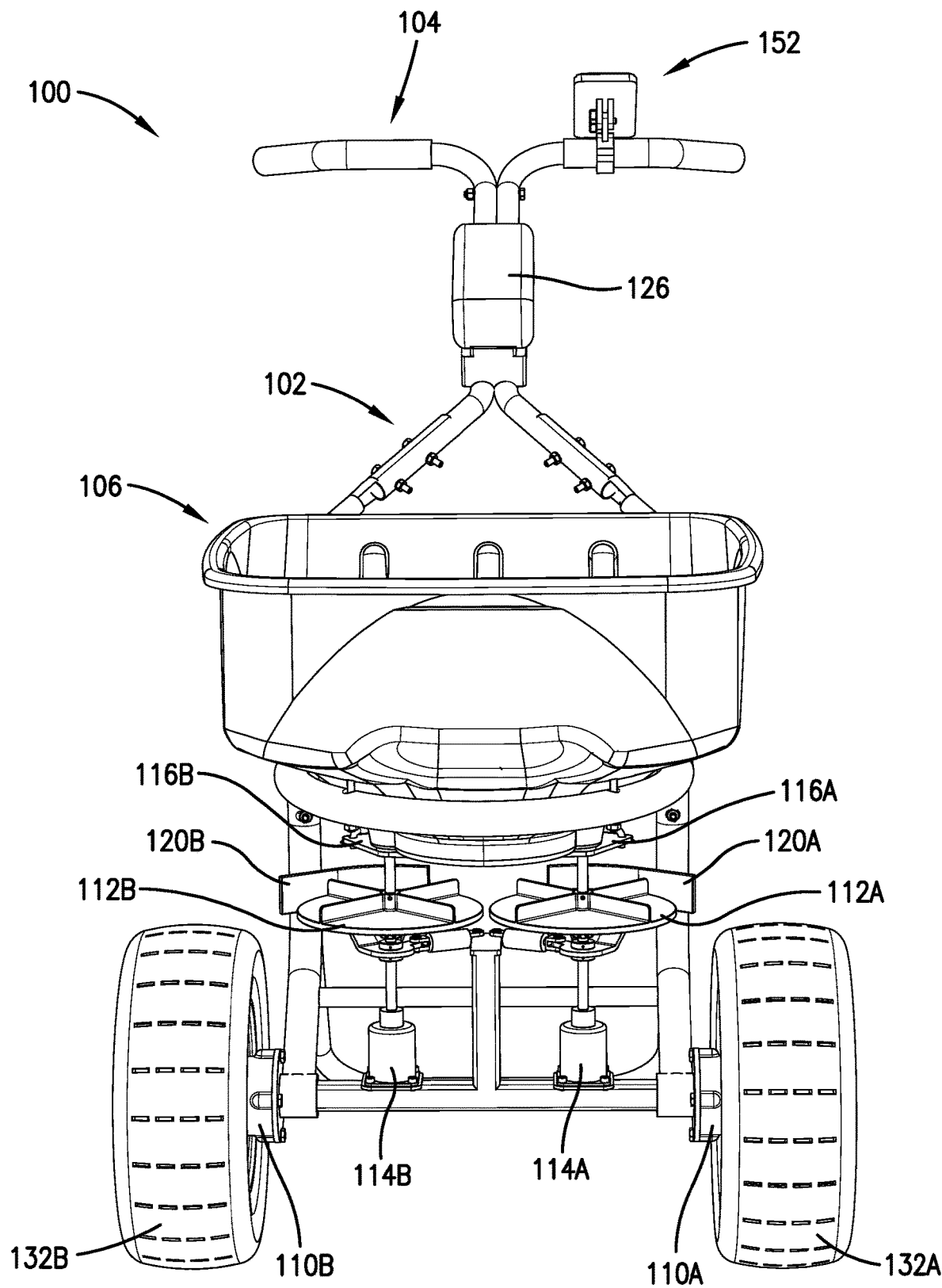
FIG. 3 is a front elevation view of the spreader of FIG. 1.
Figure 4:
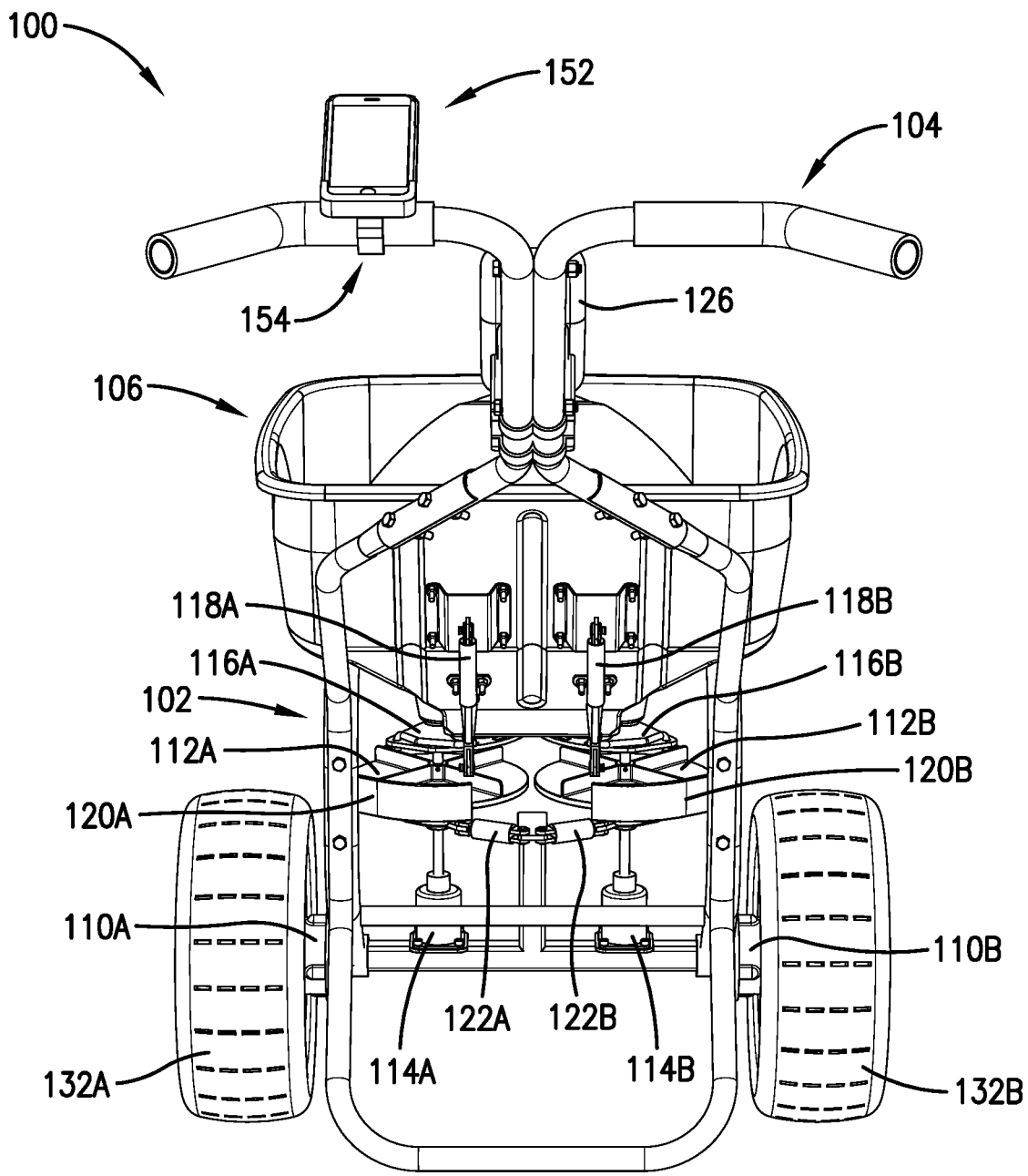
FIG. 4 is a rear elevation view of the spreader of FIG. 1.
Figure 5:
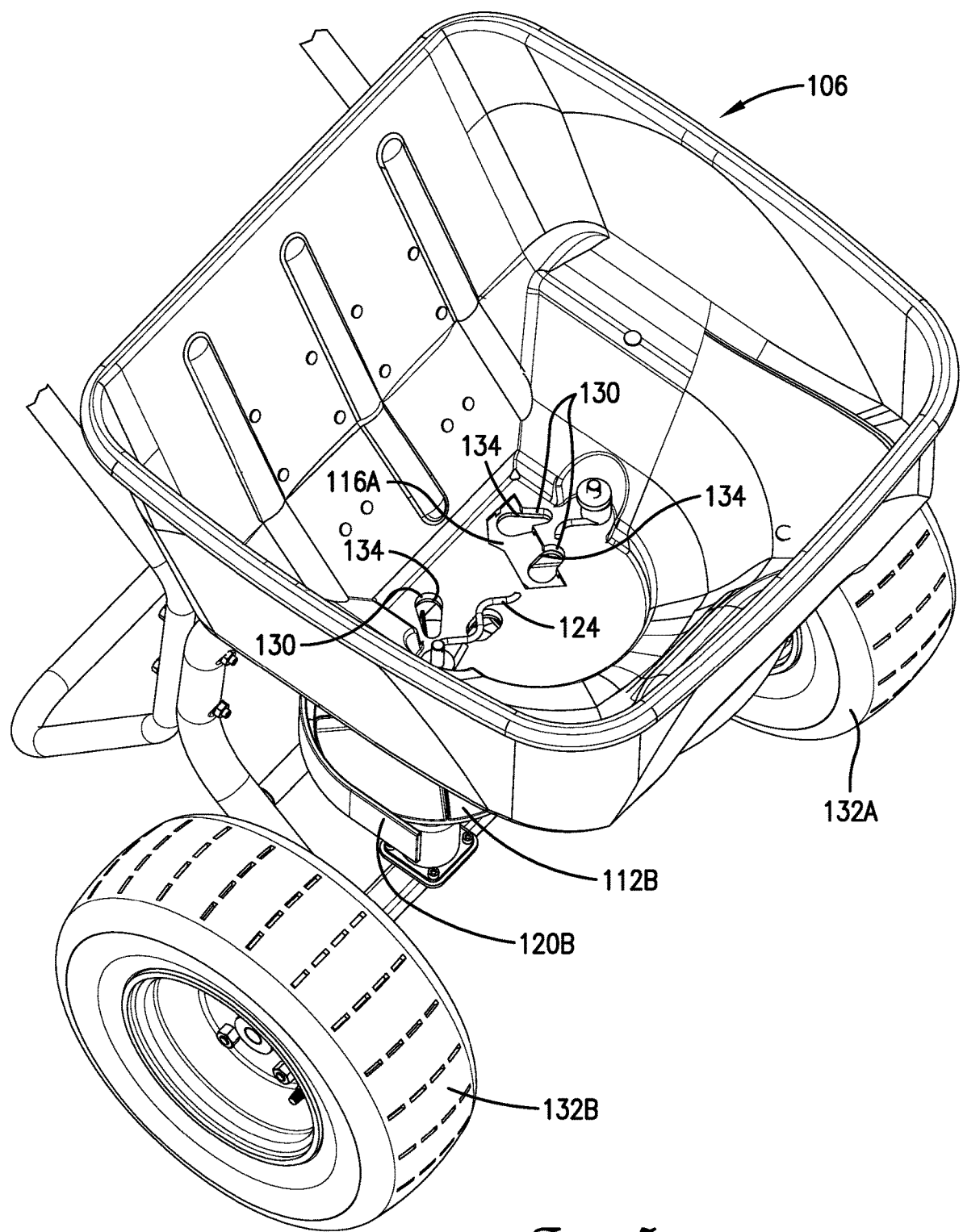
FIG. 5 is a top perspective view of the spreader of FIG. 1.
Figure 6:
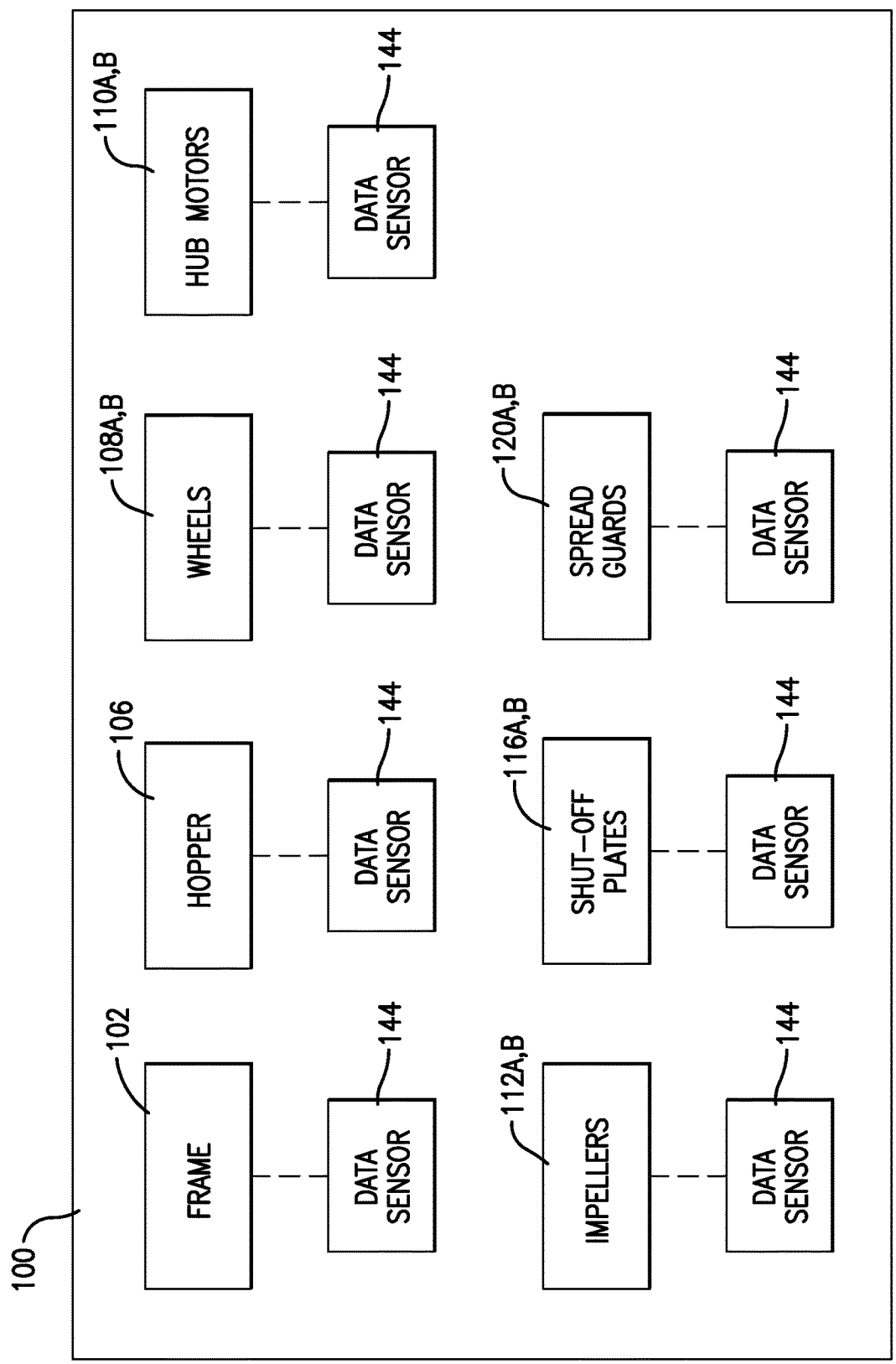
FIG. 6 is a schematic diagram of certain components of the spreader of FIG. 1.
Figure 7:
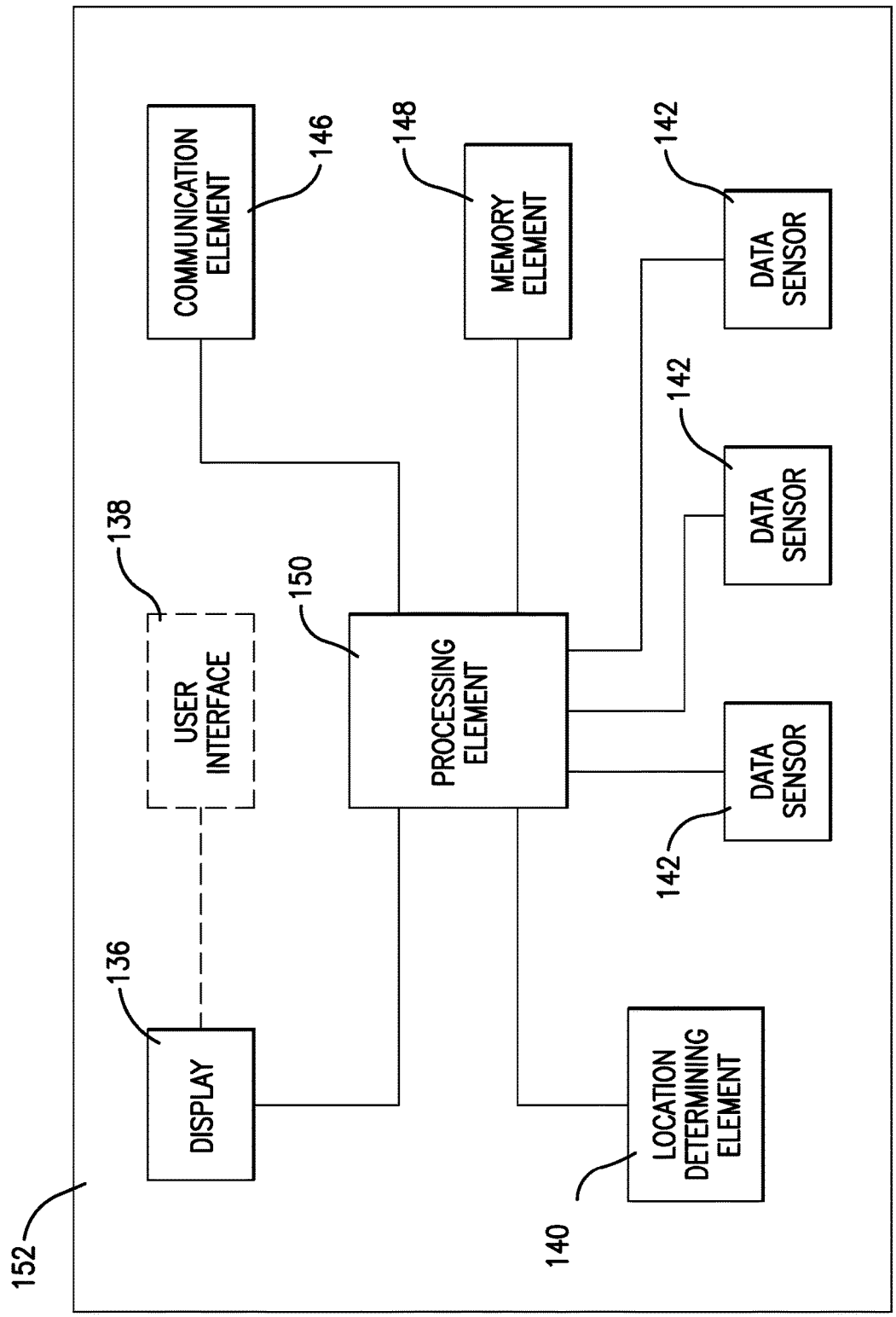
FIG. 7 is a schematic diagram of certain components of a mobile device associated with the spreader of FIG. 1.
Figure 8:
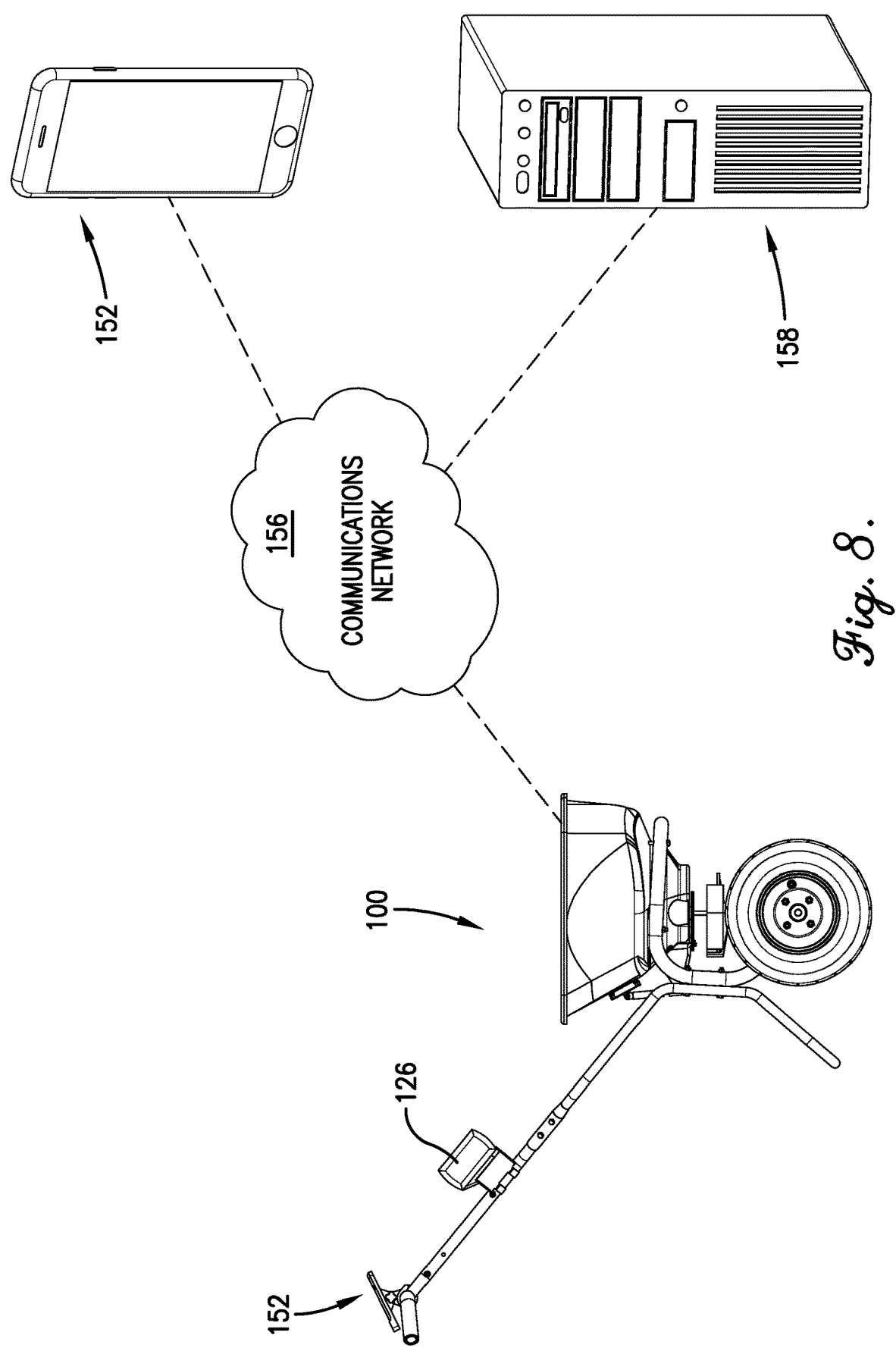
FIG. 8 is a schematic diagram of a spreading system in accordance with an embodiment of the invention.
Figure 9:
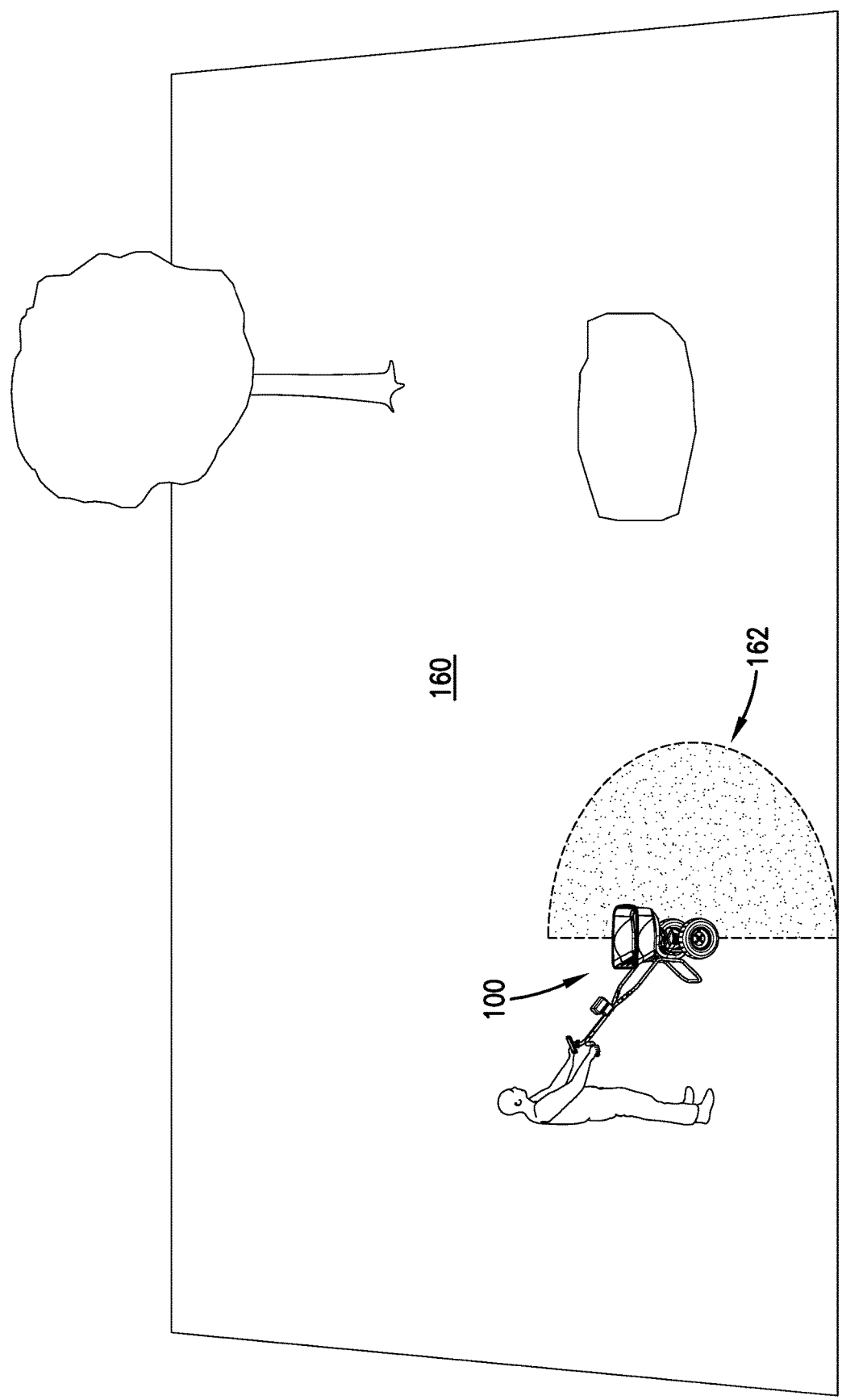
FIG. 9 is an environmental view including the spreader of FIG. 1.
Figure 10:
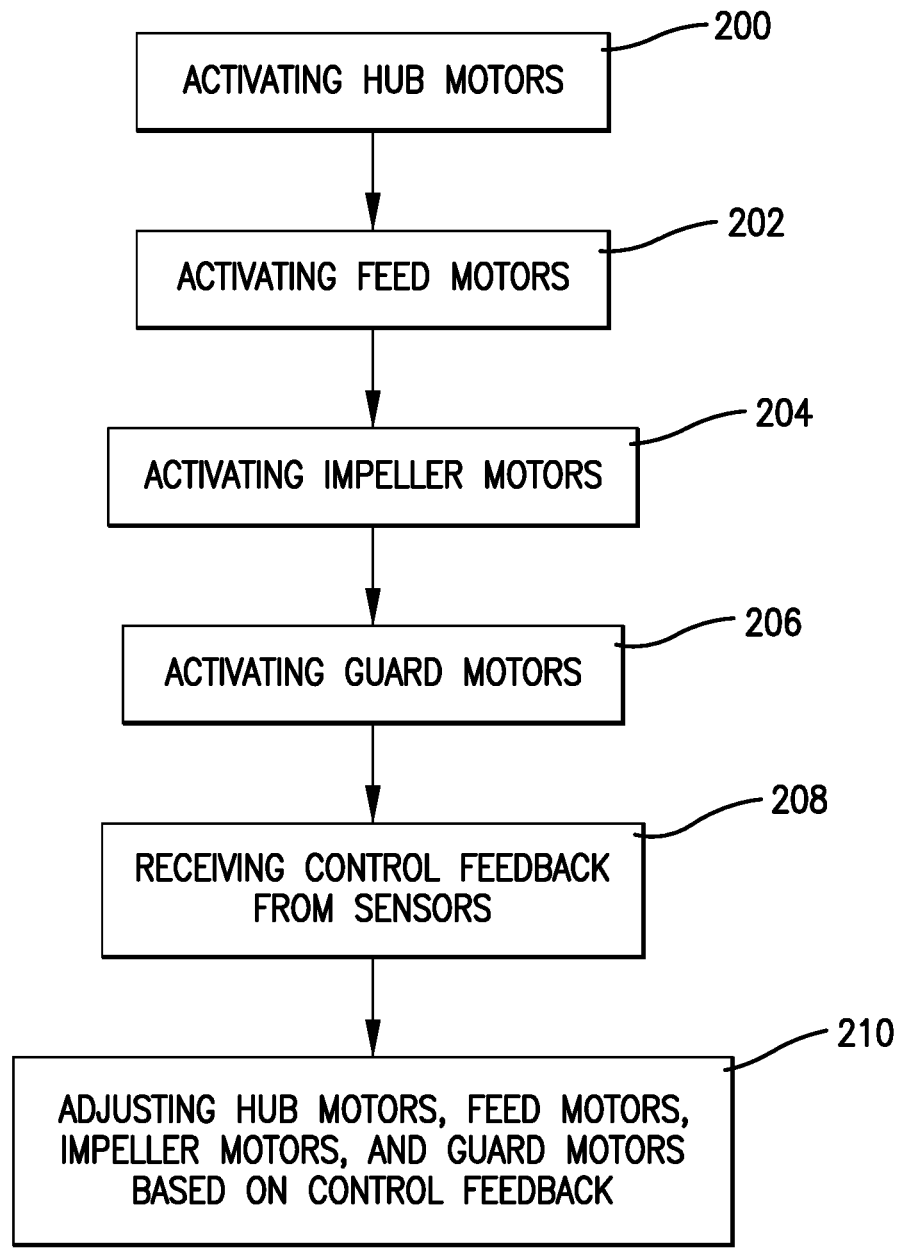
FIG. 10 is a flow diagram depicting certain method steps of spreading particulate matter in accordance with an embodiment of the invention.

The drawing figures do not limit the present invention to the specific embodiments disclosed and described herein.

The drawings are not necessarily to scale, emphasis instead being placed upon clearly illustrating the principles of the invention.

DETAILED DESCRIPTION OF THE INVENTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Turning to FIGS. 1-9, a spreader 100 constructed in accordance with an embodiment of the invention is illustrated. The spreader 100 broadly comprises a frame 102, a handle 104, a hopper 106, left and right wheels 108A,B, left and right hub motors 110A,B, left and right impellers 112A,B, left and right impeller motors 114A,B, left and right shut-off adjustment plates 116A,B, left and right feed motors 118A,B, left and right spread guards 120A,B, left and right guard motors 122A,B, an agitator 124, a battery 126, and a control system. The spreader 100 is described in terms of dual hub motors, dual impellers, dual impeller motors, dual shut-off adjustment plates, dual feed motors, dual spread guards, and dual guard motors forming the bases for several aspects of the invention, but other aspects of the invention can be realized with single-component implementations, such as a single hub motor to drive both of the wheels 108A,B connected by an axle and a single impeller.

The frame 102 supports the hopper 106 and may include tubular members connected together. Some of the tubular members may have radiused bends for a strengthened and more ergonomic structure. The frame 102 may include a stand for supporting the spreader 100 with the left and right wheels 108A,B when the spreader 100 is not in use.

The handle 104, which may be part of the frame 102, extends upward and rearward from below the hopper 106. The handle 104 allows a user to guide the spreader 100 when the spreader 100 is in motion from the left and right hub motors 110A,B. The handle 104 also allows the user to push or pull the spreader 100 when the left and right hub motors 110A,B are not providing power (such as when the battery 126 has been depleted of energy). The user may need to exert a small lifting force on the handle 104 to balance the spreader 100 on the left and right wheels 108A,B when the spreader 100 is in motion.

The hopper 106 is an open-topped container for holding particulate material. The hopper 106 includes a plurality of openings 130 configured to permit particulate material to dispense from the hopper 106.

The left and right wheels 108A,B are rotatably mounted to the frame 102 (via the left and right hub motors 110A,B) and laterally spaced apart from each other for traversing the surface 160. The left and right wheels 108A,B may be fitted with tires 132A,B for contacting the surface 160. In an alternative embodiment, a single wheel may be located approximately laterally midway on the frame 102, in which case the frame 102 may be balanced on the single wheel during use. The left and right wheels 108A,B may also include brakes. The brakes may be electric brakes, friction brakes, or the like. Alternatively as discussed below, braking may be achieved via counterforces generated by the left and right hub motors 110A,B.

The left and right hub motors 110A,B drive the left and right wheels 108A,B, respectively and are powered by the battery 126. The left and right hub motors 110A,B may be at least partially positioned in wheel wells of the left and right wheels 108A,B and each include a stator and a rotor. The stator may be affixed to the frame 102 while the rotor is attached to the wheel and rotatably driven relative to the stator. The left and right hub motors 110A,B may be direct drive or may include an internal transmission. The internal transmission may be a single speed transmission for effecting a faster or slower rotation speed of the wheel compared to direct drive. Alternatively, the transmission may be multiple speed or variable speed for changing the rotation speed of the wheel during use. In one embodiment, the transmission may include a planetary gear and ring gear drive train. As discussed above, braking may be achieved via counterforces generated by the left and right hub motors 110A,B. These counterforces may be utilized to create a regenerative charge to recharge the battery (i.e., regenerative braking).

The left and right hub motors 110A,B may independently drive the left and right wheels 108A,B relative to each other and relative to the left and right impeller motors 114A,B. Differential speeds between the left and right hub motors 110A,B may be used to turn the spreader 100 along an arc. The left and right hub motors 110A,B may also be reversed to move the spreader 100 backwards. Furthermore, one hub motor may be driven in reverse while the other hub motor is driven forward to turn the spreader 100 in place. Power may also be allocated between the left and right hub motors 110A,B as needed according to terrain and surface conditions to prevent slipping, rut creation, and path deviation. The left and right hub motors 110A,B may be configured to be disengaged (e.g., for coasting down an incline or when no electric assist is desired) and reengaged as needed. To that end, the left and right hub motors 110A,B may be "one-way motors", or disengagement can occur in gearboxes or drivetrains between the left and right hub motors 110A,B and the left and right wheels 108A,B. The left and right hub motors 110A,B may also include or be communicatively coupled with servant controllers configured to activate the left and right hub motors 110A,B according to instructions received from the control system. The servant controllers may also be considered part of the control system.

The left and right impellers 112A,B are rotatably mounted to the frame 102 below the hopper 106 to receive particulate material and fling the particulate material radially outward onto the surface 160. The left and right impellers 112A,B may be independently driven relative to each other and relative to the left and right wheels 108A,B. The left and right impellers 112A,B may rotate in opposite directions from each other or in the same direction.

The left and right impeller motors 114A,B are drivably connected to the left and right impellers 112A,B, respectively. The left and right impeller motors 114A,B are powered by the battery 126 and may be constant speed or variable speed motors. The left and right impeller motors 114A,B may also be connected to the left and right impellers 112A,B via a transmission, gear train, belt drive, or the like to effect a certain impeller rotation speed or for providing a number of impeller rotation speed options.

The left and right shut-off adjustment plates 116A,B are positioned between the hopper 106 and the left and right impellers 112A,B and are configured to pivot, rotate, or shift within a range of positions. The left and right shut-off adjustment plates 116A,B may include a plurality of exit openings 134 configured to be in a range of alignment (from complete alignment to completely offset) with the openings 130 of the hopper 106 depending on the current positions of the left and right shut-off adjustment plates 116A,B. The left and right shut-off adjustment plates 116A,B may be independently driven relative to each other via the left and right feed motors 118A,B.

The left and right feed motors 118A,B are drivably connected to the left and right shut-off adjustment plates 116A,B, respectively. The left and right feed motors 118A,B are powered by the battery 126 and may be stepper motors, servo motors, or the like.

The left and right spread guards 120A,B are positioned near the left and right impellers 112A,B and each are configured to be shifted between a non-obstructing position and an obstructing position. In the obstructing position, the left or right spread guard 120A,B obstructs particulate spreading of the left or right impeller 112A,B to prevent particulate matter from being flung to the surface 160. This may be useful to block particulate matter from being spread onto sidewalks, flower beds, adjacent properties, or other areas while particulate delivery near the spreader 100 is still desired. The left and right spread guards 120A,B may be independently activated relatively to each other. In an alternative embodiment, the left and right spread guards 120A,B may alternatively be manually activated.

The left and right guard motors 122A,B activate the left and right spread guards 120A,B, respectively. Specifically, the left and right guard motors 122A,B may be configured to independently shift the left and right spread guards 120A,B between a non-obstructing position and an obstructing position. The left and right guard motors 122A,B may be solenoids, stepper motors, or any other suitable motors.

The agitator 124 is configured to spin, oscillate, or otherwise move within the hopper 106 to facilitate channeling particulate material through the openings 130. In one embodiment, the agitator 124 is drivably linked to the left and right impellers 112A,B.

The battery 126 provides electrical power to the left and right hub motors 110A,B, the left and right impeller motors 114A,B, the left and right feed motors 118A,B the left and right guard motors 122A,B, and the control system. The battery 126 may also power the mobile device 152. The battery 126 may be rechargeable or replaceable. Alternatively, the spreader 100 may receive external power via a power cord, which provides extended power at the cost of limited range.

The control system broadly comprises a display 136, a user interface 138, a location determining element 140, a plurality of data sensors 142, 144, a communication element 146, a memory element 148, and a processing element 150. Certain components of the control system are described herein as being part of a mobile device 152. The control system may also communicate with a remote server 158 over a communication network 156.

The mobile device 152 can be removably integrated with the spreader 100 and may be generally any type of portable computing device such as a smartphone, a tablet computer, a laptop computer, a phablet, smart glasses, a smartwatch, wearable electronics, or the like. In some embodiments, the mobile device 152 may be secured to an upper end of the handle 104 such that the user of the spreader 100 can easily view and manipulate the mobile device 152 while operating the spreader 100. For example, a mounting assembly 154 may be used to releasably mount the mobile device 152 onto the handle 104 of the spreader 100. In even further alternatives, the mobile device 152 may be a dedicated computing device that is permanently integrated within the spreader 100 (e.g., permanently mounted within the handle 104).

The remote server 158 may include generally any type of computing device with a communication element, a processing element, and a memory element. As such, the remote server 158 generally retains electronic data and may respond to requests to retrieve data as well as to store data. In some embodiments, the remote server 158 may also perform certain of the processes, functions, and features described herein with respect to managing and monitoring the spreading of particulate material by executing portions, or the entirety, of the computer program and/or software of embodiments of the present invention. In more detail, the remote server 158 may be embodied by a personal computer such as a desktop workstation and/or laptop computer, and/or by application servers, database servers, file servers, gaming servers, mail servers, print servers, web servers, or the like, or combinations thereof. Furthermore, the remote server 158 may include a plurality of servers, virtual servers, or combinations thereof. The remote server 158 may be configured to include or execute software such as file storage applications, database applications, email or messaging applications, web server applications, or the like, in addition to and/or in conjunction with the computer program and/or software described elsewhere herein.

The display 136 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The display 136 may include a screen on which the information is presented, with the screen possessing a square or a rectangular aspect ratio that may be viewed in either a landscape or a portrait mode. In various embodiments, the display 136 may also include a touch screen occupying the entire screen or a portion thereof so that the display 136 functions as part of the user interface 138. The touch screen may allow the user to interact with the mobile device 152 by physically touching, swiping, or gesturing on areas of the display.

The user interface 138 may comprise inputs and outputs to allows a user to interact with the mobile device 152. Inputs may include buttons, pushbuttons, knobs, jog dials, shuttle dials, directional pads, multidirectional buttons, switches, keypads, keyboards, mice, joysticks, microphones, or the like, or combinations thereof. Outputs may include audio speakers, lights, dials, meters, printers, or the like, or combinations thereof. With the user interface 138, the user may be able to control the features and operation of the display 136. For example, the user may be able to zoom in and out on the display 136 using either virtual onscreen buttons or actual pushbuttons. In addition, the user may be able to pan the image on the display 136 either by touching and swiping the screen of the display 136 or by using multidirectional buttons or dials.

The location-determining element 140 generally determines a current geolocation of the mobile device 152 and may receive and process radio frequency (RF) signals from a global navigation satellite system (GNSS) such as the global positioning system (GPS) primarily used in the United States, the GLONASS system primarily used in the Soviet Union, or the Galileo system primarily used in Europe. The location-determining element 140 may accompany or include an antenna to assist in receiving the satellite signals. The antenna may be a patch antenna, a linear antenna, or any other type of antenna that may be used with location or navigation devices. The location-determining element 140 may include satellite navigation receivers, processors, controllers, other computing devices, or combinations thereof, and memory. The location-determining element 140 may process a signal, referred to herein as a "location signal", from one or more satellites that includes data from which geographic information such as the current geolocation is derived. The current geolocation may include coordinates, such as the latitude and longitude, of the current location of the mobile device 152. The location-determining element 140 may communicate the current geolocation of the mobile device 152 to the processing element 150, the memory element 148, or both.

The data sensors 142 may be integrated with the mobile device 152 and may generally detect the position, orientation, speed, and acceleration of the mobile device 152 and thus the position, orientation, speed, and/or acceleration of the user or spreader 100 with which the mobile device 152 is associated. The data sensors 142 may include the following sensors: (i) accelerometers, (ii) magnetometers, and/or (iii) gyroscopes. The accelerometer may be used to measure linear acceleration relative to a frame of reference, and thus, can be used to detect motion of the mobile device 152 as well as to detect an angle or orientation of the mobile device 152 relative to the horizon or ground surface. By calculating an integral of a measured acceleration with respect to time, embodiments may use data obtained by the accelerometer to measure a velocity of the mobile device 152. Similarly, by calculating a double integral of a measured acceleration with respect to time, embodiments may use data obtained by the accelerometer to measure a displacement distance of the mobile device 152.

The magnetometer may be used as a compass to determine a direction of magnetic north and bearings of the mobile device 152 relative to magnetic north. The gyroscope may be used to detect both vertical and horizontal orientation of the mobile device 152, and together with the accelerometer and magnetometer may be used to obtain accurate information about the orientation of the mobile device 152. In some additional embodiments, the location-determining element 140 may be included as a data sensor 142. Although some embodiments may incorporate the use of one or more of the above-described sensors for the data sensors 142 of the mobile device 152, it should be understood that other sensors may also be used.

In addition to the above-described data sensors 142, which can be used to obtain data relevant to the position, speed, and/or acceleration of the spreader 100, an embodiment may provide for the spreader 100 to include other types of data sensors 144 that can collect and provide data relevant to managing and/or monitoring operational attributes of the spreader 100. For instance, the hopper 106 may include one or more data sensors 144, such as weight sensors, optical sensors, etc., configured to measure an amount of particulate material being held within the hopper 106. Each of the shut-off adjustment plates 116A,B may be associated with a data sensor 144, such as a displacement sensor, an optical sensor, a rotary encoder, etc., for measuring a position of the shut-off adjustment plates 116A,B. As such, the data sensors 144 may obtain information as to whether the shut-off adjustment plates 116A,B are completely open (i.e., so as to not restrict the flow of particulate material through the outlet openings of the hopper 106), completely closed (i.e., so as to completely restrict the flow of particulate material through the outlet openings of the hopper 106), or at some position in between (i.e., so as to partly restrict the flow of particulate material through the outlet openings of the hopper 106). Furthermore, each of the impellers 112A,B may be associated with a data sensor 144, such as an RPM sensor, a rotary encoder, etc., for measuring a rotational rate of the impellers 112. Such data sensors 144 may transmit their obtained data wirelessly back to the mobile device 152 as was previously described, such that the mobile device 152 can use the data to manage and monitor operational attributes, e.g., application rates and coverage areas, of the spreader 100.

In more detail, the spreader 100 may include one or more data sensors 144 that are configured to measure (or to provide an indication of) a position, speed, and/or acceleration of the spreader 100. Such data sensors 144 may, for example, be connected to or otherwise associated with the frame 102, the wheels 108A,B, the impellers 112A,B, the shut-off adjustment plates 116A,B, the spread guards 120A,B or the various motors associated therewith. The data sensors 144 that measure a position, speed, and/or acceleration of the spreader 100 may include accelerometers or location-determining elements (e.g., a GPS receiver). For example, the frame 102 of the spreader 100 may include or may be associated with an accelerometer for measuring acceleration experienced by the spreader 100. Alternatively, the frame 102 of the spreader 100 may include or may be associated with a GPS receiver that can obtain terrestrial location information of the spreader 100 based on satellite. Sequential location information obtained by the GPS receiver may be used to also compute speed and acceleration information for the spreader 100.

In further alternatives, other data sensors 144 may be used to obtain speed information for the spreader 100. For example, one or both of the wheels 108A,B, may be associated with data sensors 144 in the form of rotations per minute (RPM) sensors. Such RPM sensors may comprise one or more gyroscopes and/or accelerometers that are configured to measure rates of rotation. As such, the RPM sensors may be connected to or otherwise associated with one or both of the wheels 108A,B to measure a rate of rotation. Using the measured rotation rate along with a pre-defined outer circumference of the wheels 108A,B (and/or tires 132A,B placed on the wheels 108A,B), a speed of the spreader 100 can be determined by taking a product of the measured rotation rate and the outer circumference of the wheels 108. The outer circumference of the wheels 108A,B may be included as part of the spreader 100 information stored in the memory element 148 of the mobile phone and/or in the memory elements of a remote server 158. It should be understood, however, that other types of sensors (apart from RPM sensors) may be used to obtain rotational information of the wheels 108. For example, rotary encoders may alternatively be used.

In some embodiments, the position, speed, and/or acceleration data obtained by the data sensors 144 may be transmitted over a communications network 156 from the spreader 100 to the mobile device 152 or the remote server 158 for further analysis, such as for managing and/or monitoring the operational attributes, including application rates and coverage areas, of the spreader 100 spreading particulate material, as will be discussed in more detail below. The communications network 156 may be wired or wireless. As such, for instance, the data sensors 144 of the spreader 100 may be configured to transmit data (e.g., speed-related data of the spreader 100) to the mobile device 152 or remote server 158 wirelessly (e.g., via Bluetooth) for further analysis. For instance, the data sensors 144 (e.g., RPM sensors) may obtain information indicative of a speed of travel of the spreader and transmit such information to the mobile device 152. The mobile device 152 may compute the actual travel speed of the spreader using the information received from the data sensors 144 along with an outer circumference of the wheels 108 of the spreader 100.

In some embodiments, the data sensors 144 may each include their own internal batteries for providing necessary power operate the data sensors 144 in the manners described herein. In some alternative embodiments, the data sensors 144 may be powered by the battery 126. Regardless, the data sensors 144 may be configured to continuously transmit data to the mobile device 152, such that the mobile device 152 can obtain and/or generate operational attributes of the spreader 100 in real-time.

The communication element 146 may be configured as one or more transceivers that utilize radio frequency (RF) communication, such as cellular, WiFi, Bluetooth™, or the like, that allow the mobile device 152 to wirelessly communicate with other devices, sensors, systems, or networks. For example, the communication element 146 may include signal or data transmitting and receiving circuits, such as antennas, transceivers, amplifiers, filters, mixers, oscillators, digital signal processors (DSPs), and the like to transmit data to and receive data from remote server 158. The communication element 146 may establish communication wirelessly by utilizing RF signals and/or data that comply with communication standards such as cellular 2G, 3G, or 4G, IEEE 802.11 standard such as WiFi, IEEE 802.16 standard such as WiMAX, Bluetooth™, or combinations thereof. Alternatively, or in addition, the communication element 146 may establish communication through connectors or couplers that receive metal conductor wires or cables which are compatible with networking technologies such as ethernet. In certain embodiments, the communication element 146 may also couple with optical fiber cables. As such, in some embodiments, the mobile device 152 may be configured to communicate with other devices, sensors, systems, or networks via a wired connection. The communication element 146 may be in communication with or electronically coupled to the memory element 148 and/or the processing element 150.

The memory element 148 may include one or more electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 148 may be embedded in or packaged with the processing element 150. The memory element 148 may include, or may constitute, a "computer-readable medium." The memory element 148 may store the instructions, code, code segments, software, firmware, computer programs, applications, apps, services, daemons, or the like that are executed by the processing element 150.

The processing element 150 may include one or more electronic hardware components such as processors, microprocessors (single-core and multi-core), controllers, microcontrollers, digital signal processors (DSPs), field-programmable gate arrays (FPGAs), analog and/or digital application-specific integrated circuits (ASICs), or the like, or combinations thereof. The processing element 150 may generally execute, process, or run instructions, code, code segments, software, firmware, computer programs, applications, apps, processes, services, daemons, or the like. The processing element 150 may also include hardware components such as finite-state machines, sequential and combinational logic, and other electronic circuits that may perform the functions necessary for the operation of the present invention. The processing element 150 may be in communication with the other electronic components through serial or parallel links that include address busses, data busses, control lines, and the like.

Various processes, functions, and features of embodiments of the present invention discussed herein may be performed by the processing element 150 to carry out instructions of a computer program, software, firmware, or combinations thereof stored on the memory element 148. In some embodiments, the computer program may be in the form of a mobile "app."

Use of the spreader 100 will now be described in detail. First, particulate material may be loaded into the hopper 106. The spreader 100 may be positioned or maneuvered onto the surface 160 to a starting point of a spreading path. This may be via human power or via hub motor assistance. The shut-off adjustment plates 116A,B may heretofore be in a closed position to prevent particulate material from being prematurely dispensed from the hopper 106.

The hub motors 110A,B may then be activated according to a user input so as to drive the wheels 108A,B and propel the spreader 100 forward along a spreading path, as shown in block 200. The user may provide supplemental force or guidance via the handle 104. Alternatively, the hub motors 110A,B may be activated according to a user-initiated spreading plan, in which case the hub motors 110A,B may drive the wheels 108A,B to propel the spreader along a predetermined spreading path. The left and right hub motors 110A,B may also be disengaged (e.g., for coasting down an incline or when no electric assist is desired) and reengaged as needed. Alternatively, disengagement can occur in gearboxes or drivetrains between the left and right hub motors 110A,B and the left and right wheels 108A,B.

The feed motors 118A,B may be activated according to a user input or according to the spreading plan to shift the shut-off adjustment plates 116A,B to an open or partially open position once the spreader 100 begins traversing the surface 160 where spreading is desired, as shown in block 202. In the open or partially open positions, the exit openings 134 align or partially align with the openings 130 of the hopper 106, thereby allowing particulate material to drop onto the impellers 112A,B. A degree of alignment between the exit openings 134 and the openings 130 may be chosen depending on a desired feed rate. For example, half alignment may equate to half as much particulate material being dispensed compared to complete alignment. The feed motors 118A,B, being independently driven, can effect desired left and right feed rates independent from a current spreading width and traversing speed of the spreader 100.

The impeller motors 114A,B may be activated according to a user input or according the spreading plan to rotate the impellers 112A,B, as shown in block 204. The rotating impellers 112A,B receive the particulate material and fling the particulate material radially outwardly from the spreader 100 onto an area 162 of the surface 160. A speed of each impeller motor 114A,B, which may be selected by the user or effected by the spreading plan, determines how far the particulate material is flung and hence a spreading width or spreading pattern of the particulate material. The impeller motors 114A,B, being independently driven, can effect a desired spreading width or spreading pattern (having independent left and right regions) independent from the left and right feed rates and independent from the traversing speed of the spreader 100. The agitator 124 may also be driven to oscillate or move to improve dispensation of particulate material through the openings 130.

The guard motors 122A,B may be activated according to a user input or according to the spreading plan to actuate the left and right spread guards 120A,B for preventing or limiting spreading in certain areas, as shown in block 206. For example, the spreader 100 may pass a flower bed on its right side in which particulate material is not desired. The right guard motor 122B thus may be activated to shift the right spread guard 120B to a guarding position. In this way, the right impeller 112B may continue dispensing particulate material without spreading it onto the flower bed. The guard motors 122A,B, being independently driven, can restrict the spreading width or spreading pattern as needed without changing impeller speeds.

As the spreader 100 traverses the surface 160 spreading particulate material, the data sensors 142, 144 transmit sensed data to the processing element 150 as control feedback or for analysis, as shown in block 208. For example, the processing element 150 may receive traversing speed data from the speed sensor 144. Similarly, the processing element 150 may receive location data from the location sensor 144 indicating a position of the spreader 100.

The processing element 150 may then control the left and right hub motors 110A,B, impeller motors 114A,B, feed motors 118A,B, and guard motors 122A,B based on the speed data, location data, and other data, as shown in block 210. For example, the processing element 150 may change the speed of one of the left and right hub motors 110A,B to turn the spreader 100, thereby keeping the spreader 100 on the spreading path.

Turning to user operation of the spreader 100 in more detail, it is beneficial if the user can manage and monitor, in real-time, one or more operational attributes of the spreader 100, such as the application rates and coverage area of the particulate material being spread by the spreader 100. To accomplish this, embodiments provide for the user to associate the user's mobile device 152 with the spreader 100. For example, the user may attach the mobile device 152 to the mounting assembly 154 positioned on the handle 104 of the spreader 100. In addition, the mobile device 152 may communicatively couple (e.g., wirelessly "pair") with one or more data sensors 144 associated with the spreader 100, such as via Bluetooth connection. In such a configuration, the user can interact with the mobile device 152 (e.g., via the user interface 138) and view the display 136 of the mobile device 152 while operating the spreader 100 to distribute particulate material over the surface 160.

As was noted previously, the mobile device 152 can be used to manage and/or monitor the spreading of particulate material onto the surface 160 by providing information to the user that is relevant to the spreading (e.g., operational attributed such as application rates and coverage area). Operational attributes may be dependent, at least partly, on the type of spreader 100 used and the type of particulate material being spread. As such, the user can select the type of spreader 100 to be used and the type of particulate material being spread into the mobile device 152. Based on the selected type of spreader 100 and type of particulate material, the mobile device 152 may provide various standard operational attributes, such as a standard application rate and a standard coverage area of the selected spreader 100 distributing the selected particulate material onto the surface 160. In some embodiments, the mobile device 152 may be configured to present instructions to the user on how the settings of the spreader should be configured to provide for the desired application rate and coverage area. The mobile device 130 may also present instructions on how the user can adjust the settings of the spreader (e.g., the position of the shut-off plates 114) so as to increase or decrease the application rate and coverage area from the standard application rate and coverage area. The mobile device 152 may also be used to configure maximum speed, acceleration curves, and other parameters. The mobile device 152 may also provide "throttle control" (i.e., electric power control) to allow the user to indicate how much electric assist is desired, particularly when traversing uphill and downhill.

In some embodiments, the user may be able to manually adjust the application rate and coverage area. For example, the user may be able to adjust the actual application rate of the spreader 100 by adjusting the shut-off plates adjustment 116A,B of the spreader 100. For instance, if the user wishes to reduce the application rate, the user can partly close the shut-off adjustment plates 116A,B so as to restrict the passage of particulate material through the openings 130 of the hopper 106. To accommodate for such change on the mobile device 152, the user may provide an indication of such change into the mobile device 152 so that the mobile device 152 can present the correct application rate. Similarly, if the user intends the spreader 100 to traverse the surface 160 faster or slower, then the user may also provide an indication of such change into the mobile device 152 so that the mobile device 152 can present the correct coverage area.

The mobile device 152 may present the determined operational attributes of the spreader 100, including the application rate and coverage area, to the user in various formats. For example, the mobile device 152 may present on the display 136 numerical values for each of the application rate and coverage area. Alternatively, the mobile device 152 may present the application rate and/or the coverage area graphically. For example, the mobile device 152 may present a graphical user interface (GUI) in the form of a graphical representation of the surface 160 (e.g., a graphical map) over which the spreader 100 is spreading particulate material. The graphical map may be generated by accessing various mapping programs (e.g., Google Maps™) available on the mobile device 152. Alternatively, the user may generate a graphical map by traveling around a boundary of the surface 160 with the spreader 100 while tracking the user's location with a location-determining element associated with the spreader 100 (e.g., a data sensor 160 in the form of a GPS receiver) or associated with the mobile device 152 (e.g., the location-determining element 140).

Regardless, the mobile device 152 may generate a GUI that includes a graphical representation of the spreader 100 overlaid on the graphical map. The position of the graphical representation of the spreader 100 on the graphical map may be updated in real time via the location-determining element 140 associated with the spreader 100 (e.g., a data sensor 142 in the form of a GPS receiver) or associated with the mobile device 152 (e.g., the location determining element 140). In addition, the mobile device 152 may present an accurate, real-time graphical presentation of the coverage area. Specifically, the mobile device 152 may use the data related to the selected spreader 100, the data related to the selected particulate material, and the real-time speed of the spreader 100 (as obtained by one or more of the data sensors 144 of the spreader 100) to determine an accurate, real-time coverage area, which can be displayed on the GUI. The displayed coverage area may be presented in an accurate format so as to provide an indication to the user as to the actual, real-time coverage area (i.e., the area within the surface 160 over which particulate material is being spread) being generated by the spreader 100 as the spreader travels over and spreads particulate material onto the surface 160. The user can monitor, in real-time, the actual coverage area being generated by the spreader 100, such that the user can know whether the current settings are appropriate.

The GUI generated by the mobile device 152 may also present operational attributes in the form of real-time application rates of the spreader 100. Such application rates may be presented numerically or graphically. For instance, the application rates may be presented in the form of a colored-coded alert (e.g., yellow—indicative of a slow application rate, green —indicative of a standard application rate, or red—indicative of a fast application rate), a bar gauge/dial, a speedometer-type gauge/dial, or the like. Alternatively, or in addition, when the application rate is presented in the form of an application density applied to the surface 160, embodiments may provide for such an application rate to be presented as a fill gradient of the coverage area.

Embodiments may present other real-time information related to the user's use of the spreader 100. For example, in embodiments of the spreader 100 that include a data sensor 144 in the form of a fill sensor associated with the hopper 106, the data sensor 144 may send data to the mobile device 152 such that the mobile device 152 may be configured to present to the user a real-time fill amount or weight of particular material being held in the hopper 106. In addition, data sensors 144 (such as position sensors) associated with the shut-off adjustment plates 116A,B may send data to the mobile device 152 such that the mobile device 152 may be configured to present to the user a real-time position information related to the position of the shut-off adjustment plates 116A,B. In some embodiments, the position information of the shut-off adjustment plates 116A,B may be used to determine application rates and/or coverage areas for the spreader 100. Furthermore, it should be understood that in some embodiments, the mobile device 152 may use certain of its own internal data sensors 142 in place of (or in addition to) the data sensors 144 of the spreader 100 to determine operational attributes of the spreader 100, such as application rates and/or coverage areas. For example, the mobile device 152 may use internal location-determining element 140 (e.g., GPS receiver) and/or data sensors 142 (e.g., accelerometers) to determine a position, speed, and/or acceleration of the spreader 100 whenever the mobile device 152 is secured to the spreader 100.

Embodiments provide for all of the data collected and analyzed by the mobile device 152 to be stored for future use and analysis. For example, each time the user uses the spreader 100 to apply particulate material to a surface, the mobile device 152 may store the total amount of particulate material applied to the surface and the date/time of application. As such, the user can review each previous application to determine if appropriate amounts have been historically applied to the surface. In some embodiments, the mobile device 152 may transmit all of such data to the server 158 for storage and for future analysis.

The spreader 100 may operate autonomously or semi-autonomously, with various levels or aspects of user assistance. For example, the user may control application rates and coverage areas while the spreader 100 follows a predetermined path. As another example, the user may maneuver the spreader 100 while the spreader 100 automatically dictates application rates and coverage areas. Autonomous aspects may be chosen or set via inputs on the mobile device 152. In autonomous modes or semi-autonomous modes, the user may be monitoring the spreader 100 nearby, remotely monitoring the spreader 100 via the communications network 156, or not monitoring the spreader 100 at all.

The above-described spreader 100 provides several advantages. For example, the left and right hub motors 110A,B provide complete and independent speed control and walk-behind self-power or power assist. The left and right impeller motors 114A,B, left and right feed motors 118A,B, and left and right guard motors 122A,B provide complete and independent particulate material spreading control. The control system provides the user complete control of virtually every aspect of the spreader 100. The control system also provides on-site or remote data analysis for improved spreader performance and surface treatment.

Certain components described above may form a kit configured to be integrated with an existing spreader. For example, the left and right hub motors 110A,B may be fitted onto wheels of an existing spreader to provide propulsive power assistance thereto. The rechargeable battery 126 may also be mounted onto the existing spreader and electrically connected to the left and right hub motors 110A,B. A user may download the above-described application onto his mobile device and pair the mobile device with the left and right hub motors 110A,B (via servant controllers of the left and right hub motors 110A,B). Control of the propulsive power assistance may thus be achieved via the application as described above.

Figure 11:
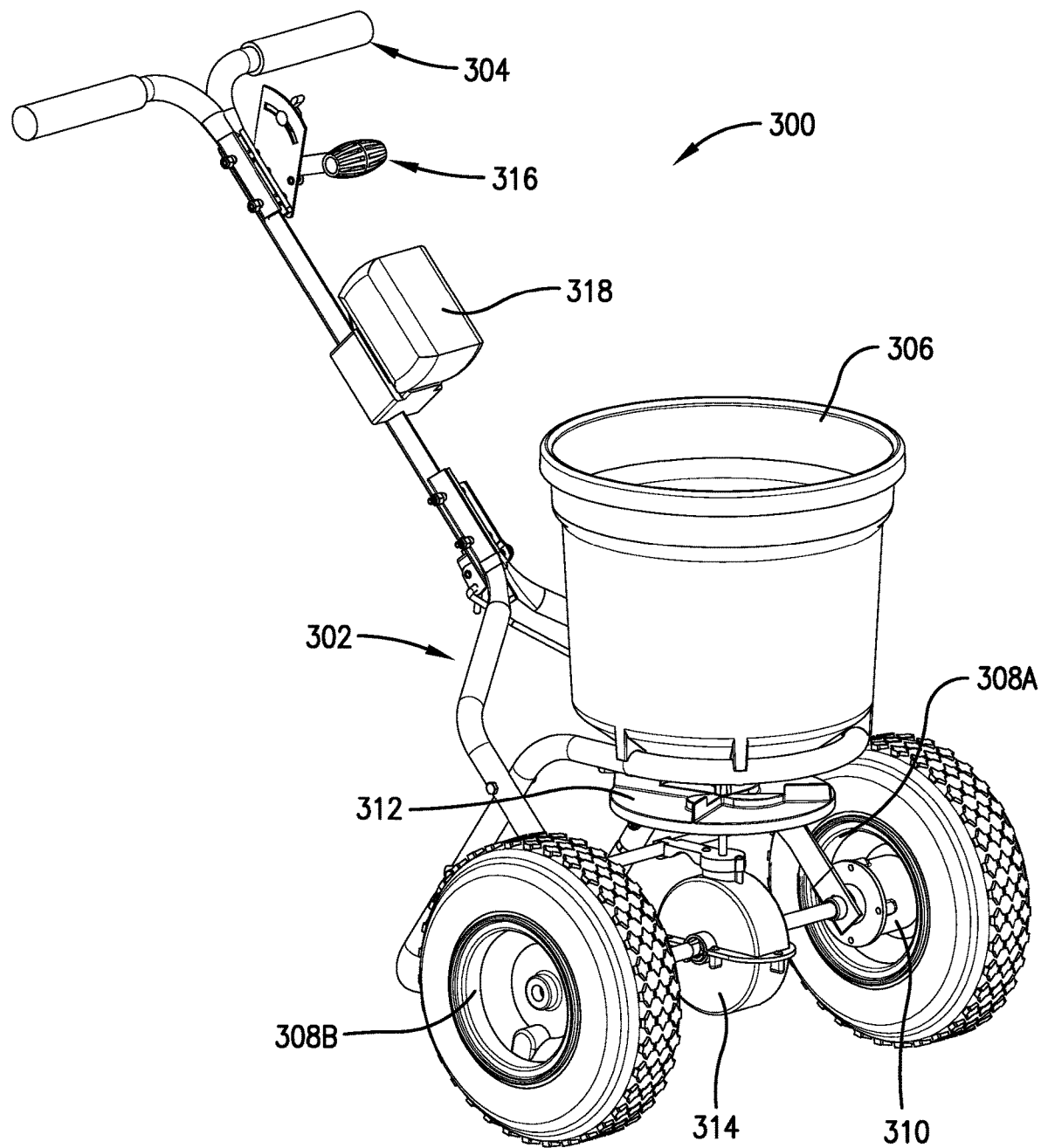
FIG. 11 is a top perspective view of a spreader constructed in accordance with another embodiment of the invention.

Turning to FIG. 11, a spreader 300 constructed in accordance with another embodiment will now be described. The spreader 300 broadly comprises a frame 302, a handle 304, a hopper 306, left and right wheels 308A,B, a hub motor 310, an impeller 312, an impeller transmission 314, a shut-off adjustment plate, a shut-off adjustment control 316, and a battery 318.

The frame 302 supports the hopper 306 and may include tubular members connected together. Some of the tubular members may have radiused bends for a strengthened and more ergonomic structure. The frame 302 may include a stand for supporting the spreader 300 with the left and right wheels 308A,B when the spreader 300 is not in use.

The handle 304, which may be part of the frame 302, extends upward and rearward from below the hopper 306. The handle 304 allows a user to guide the spreader 300 when the spreader 300 is in motion. The handle 304 also allows the user to push or pull the spreader 300 when the hub motor 310 is not providing power (such as when the battery 318 has been depleted of energy). The user may need to exert a small lifting force on the handle 304 to balance the spreader 300 on the left and right wheels 308A,B when the spreader 300 is in motion.

The hopper 306 is an open-topped container for holding particulate material. The hopper 306 includes a plurality of openings configured to permit particulate material to dispense from the hopper 306.

The left and right wheels 308A,B are rotatably mounted to the frame 302 and laterally spaced apart from each other for traversing a surface. The left and right wheels 308A,B may be fitted with tires for contacting the surface. In an alternative embodiment, a single wheel may be located approximately laterally midway on the frame 302, in which case the frame 302 may be balanced on the single wheel during use. The left and right wheels 308A,B may also include brakes. The brakes may be electric brakes, friction brakes, or the like. Alternatively as discussed below, braking may be achieved via counterforces generated by the hub motor 310.

The hub motor 310 drives at least one of the left and right wheels 308A,B, respectively and is powered by the battery 318. The hub motor 310 may be at least partially positioned in a wheel well of one of the left and right wheels 108A,B and includes a stator and a rotor. The stator may be affixed to the frame 302 while the rotor is attached to the wheel and rotatably driven relative to the stator. The hub motor 310 may be direct drive or may include an internal transmission. The internal transmission may be a single speed transmission for effecting a faster or slower rotation speed of the wheel compared to direct drive. Alternatively, the transmission may be multiple speed or variable speed for changing the rotation speed of the wheel during use. In one embodiment, the transmission may include a planetary gear and ring gear drive train. As discussed above, braking may be achieved via counterforces generated by the hub motor 310. These counterforces may be utilized to create a regenerative charge to recharge the battery (i.e., regenerative braking). The hub motor 310 may be configured to be disengaged (e.g., for coasting down an incline or when no electric assist is desired) and reengaged as needed.

The impeller 312 may be rotatably mounted to the frame 302 below the hopper 306 to receive particulate material and fling the particulate material radially outward onto the surface. The impeller 312 may be driven by the hub motor 310 via the impeller transmission 314.

The impeller transmission 314 drivably connects the impeller 312 to the hub motor 310. The impeller transmission 314 may include a gear train, belt drive, or the like to effect a certain impeller rotation speed based on wheel rotation speed.

The shut-off adjustment plate is positioned between the hopper 306 and the impeller 312 and is configured to pivot, rotate, or shift within a range of positions. The shut-off adjustment plate may include a plurality of exit openings configured to be in a range of alignment (from complete alignment to completely offset) with the openings of the hopper 306 depending on the current positions of the shut-off adjustment plate.

The shut-off adjustment control 316 may be a lever connected to the shut-off adjustment plate via a linkage, cable, or transmission. The shut-off adjustment control 316 allows a user to change the alignment of the exit openings of the adjustment plate with the openings of the hopper 306 to dictate a material feed rate to the impeller 312.

The battery 318 provides electrical power to the hub motor 310. The battery 326 may be rechargeable or replaceable. Alternatively, the spreader 300 may receive external power via a power cord, which provides extended power at the cost of limited range.

The spreader 300 may also incorporate aspects of the spreader 100 described above. For example, the hub motor 310 may be controlled via a control system which may include a mobile device having a user interface for selecting a motor speed and hence a material spread range.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as the processing system and control systems, may be implemented as special purpose or as general purpose devices. For example, the processing system may comprise dedicated circuitry or logic that is permanently configured, such as an application-specific integrated circuit (ASIC), or indefinitely configured, such as an FPGA, to perform certain operations. The processing system may also comprise programmable logic or circuitry (e.g., as encompassed within a general-purpose processor or other programmable processor) that is temporarily configured by software to perform certain operations. It will be appreciated that the decision to implement the processing system as special purpose, in dedicated and permanently configured circuitry, or as general purpose (e.g., configured by software) may be driven by cost and time considerations.

Accordingly, the terms "processing system" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing system is temporarily configured (e.g., programmed), each of the processing elements need not be configured or instantiated at any one instance in time. For example, where the processing system comprises a general-purpose processor configured using software, the general-purpose processor may be configured as respective different processing elements at different times. Software may accordingly configure the processing system to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims. For example, the principles of the present invention are not limited to the illustrated central pivot irrigation systems but may be implemented in any type of irrigation system including linear move irrigation systems.

Having thus described various embodiments of the invention, what is claimed as new and desired to be protected by Letters Patent includes the following:

1. A spreader comprising:
   a frame;
   a hopper supported by the frame and configured to hold a particulate material;
   an impeller rotatably connected below the hopper, the impeller being configured to receive the particulate material from the hopper and spread the particulate material over a surface;
   a left wheel rotatably connected to the frame;
   a right wheel rotatably connected to the frame and laterally spaced from the left wheel for traversing the surface;
   a left electric hub motor at least partially positioned in the left wheel and configured to drivably engage the left wheel; and
   a right electric hub motor at least partially positioned in the right wheel and configured to drivably engage the right wheel,
   the left electric hub motor and the right electric hub motor being configured to drive the left wheel and right wheel independently so that differential rotor speeds between the left electric hub motor and right electric hub motor turn the spreader.

2. The spreader of claim 1, further comprising a rechargeable battery configured to provide electrical power to the left electric hub motor and right electric hub motor.

3. The spreader of claim 1, further comprising an electric motor configured to rotate the impeller at a plurality of speeds independent from a rotation speed of the left wheel and a rotation speed of the right wheel to effect a desired spread width independent from a traversing speed of the spreader.

4. The spreader of claim 1, further comprising:
   a shut-off adjustment plate configured to meter the particulate material to the impeller according to a desired feed rate; and
   an electric motor configured to adjust a position or orientation of the shut-off adjustment plate so that the feed rate is independent from a spread width of the impeller and a traversing speed of the spreader.

5. The spreader of claim 1, further comprising:
   a shut-off adjustment plate configured to meter the particulate material to the impeller according to a desired feed rate;

an electric motor configured to adjust a position or orientation of the shut-off adjustment plate; and a sensor configured to detect a traversing speed of the spreader, the electric motor being configured to switch between selectively adjusting the position or orientation of the shut-off adjustment plate according to the traversing speed of the spreader as detected by the sensor and selectively adjusting the position or orientation of the shut-off adjustment plate according to a user command so that the feed rate is independent from a spread width of the impeller and a traversing speed of the spreader.

6. The spreader of claim 1, further comprising:

a spread guard configured to shift horizontally to selectively obstruct particulate spreading of the impeller; and an electric motor configured to activate the spread guard.

7. The spreader of claim 6, the impeller being a left impeller, the spreader further comprising:

a left electric motor configured to rotate the left impeller;

a right impeller laterally spaced from the left impeller; and a right electric motor configured to rotate the right impeller independently from the left impeller to effect left and right spread widths independent from each other.

8. A spreader comprising:

a frame;

a hopper supported by the frame and configured to hold a particulate material;

an impeller rotatably connected below the hopper, the impeller being configured to receive the particulate material from the hopper and spread the particulate material over a surface;

a wheel rotatably connected to the frame for traversing the surface;

an electric hub motor at least partially positioned in the wheel and configured to drivably engage the wheel;

a shut-off adjustment plate configured to meter the particulate material to the impeller according to a desired feed rate;

an electric motor configured to adjust a position or orientation of the shut-off adjustment plate; and a sensor configured to detect a traversing speed of the spreader, the electric motor being configured to switch between selectively adjusting the position or orientation of the shut-off adjustment plate according to the traversing speed of the spreader as detected by the sensor and selectively adjusting the position or orientation of the shut-off adjustment plate according to a user command so that the feed rate is independent from a spread width of the impeller and a traversing speed of the spreader.

9. A spreader comprising:

a frame;

a hopper supported by the frame and configured to hold a particulate material;

an impeller rotatably connected below the hopper, the impeller being configured to receive the particulate material from the hopper and spread the particulate material over a surface;

a wheel rotatably connected to the frame for traversing the surface;

an electric hub motor at least partially positioned in the wheel and configured to drivably engage the wheel;

a spread guard configured to shift horizontally to selectively obstruct particulate spreading of the impeller; and an electric motor configured to activate the spread guard.

10. A spreader comprising:

a frame;

a hopper supported by the frame and configured to hold a particulate material;

a left impeller rotatably connected below the hopper;

a right impeller rotatably connected below the hopper and laterally spaced from the left impeller, the left impeller and the right impeller being configured to receive the particulate material from the hopper and spread the particulate material over a surface;

a left electric motor configured to rotate the left impeller;

a right electric motor configured to rotate the right impeller independently from the left impeller to effect left and right spread widths independent from each other;

a wheel rotatably connected to the frame for traversing the surface;

an electric hub motor at least partially positioned in the wheel and configured to drivably engage the wheel; and a spread guard configured to selectively obstruct particulate spreading of the impeller.

* * * * *